Nov. 25, 1924.  1,517,237
F. KADE
ELECTRIC CONDUCTOR OF THE LAMINATED TYPE
Filed April 18, 1922
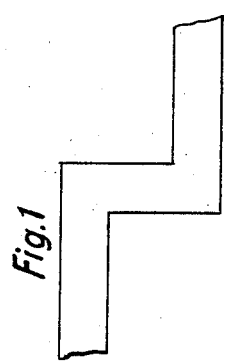
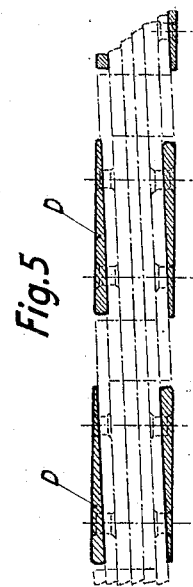
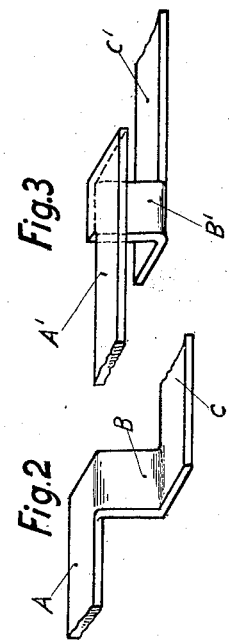
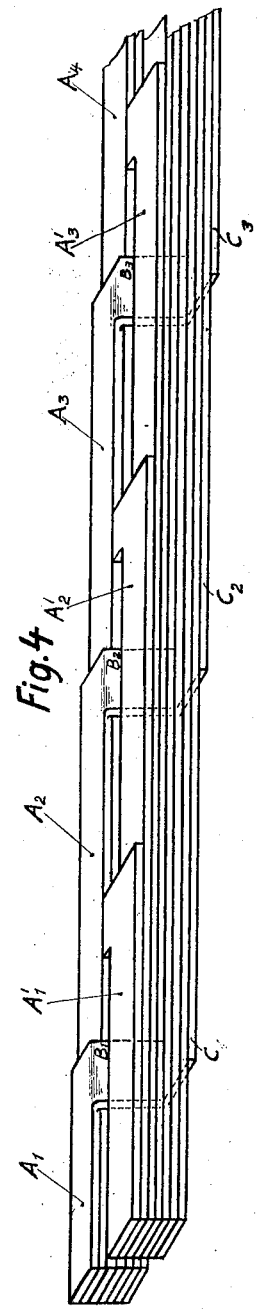
Inventor:
Friedrich Kade,
by *Albert G. Davis*
His Attorney

Patented Nov. 25, 1924.

1,517,237

UNITED STATES PATENT OFFICE.

FRIEDRICH KADE, OF CHARLOTTENBURG, GERMANY, ASSIGNOR TO GENERAL ELECTRIC COMPANY, A CORPORATION OF NEW YORK.

ELECTRIC CONDUCTOR OF THE LAMINATED TYPE.

Application filed April 18, 1922. Serial No. 555,194.

*To all whom it may concern:*

Be it known that I, FRIEDRICH KADE, a citizen of the German Republic, residing at 23 Mommsen Street, in the city of Charlottenburg, Province of Brandenburg, State of Prussia, Germany, have invented a new and useful Electric Conductor of the Laminated Type, of which the following is a specification.

My invention relates to electrical conductors for dynamo electric machines and the like, and has for its object the construction of such a conductor out of a number of laminæ, the laminæ being so arranged that the conductor will have as smooth a surface as possible.

It has been customary heretofore to construct conductors for dynamo electric machines out of a number of individual conductors or laminæ in order to avoid the losses due to eddy currents occurring in conductors conveying alternating current in electrical machines. If the laminæ or individual conductors are connected together at the ends of each slot, it is further necessary that each lamina be placed in the various elevations of the slot in the same manner, and this may be accomplished by making each lamina out of a number of pieces offset from each other, the pieces being connected by bridges. This arrangement makes it difficult, however, to place the bridges. The bridges may simply be led outside the laminations. In this case the bridges protruding outside the laminæ make the bar hard to insulate. This arrangement is also objectionable from an electrical standpoint. It has been suggested to slot each lamina in order to provide a groove for receiving the bridge, but this process is very objectionable from a manufacturing point of view. Neither is it feasible, to fill the spaces between the bridges with insulating material, in order to obtain a smooth surface, because the heat conductivity of the whole bar would be materially reduced.

By my invention all the above mentioned difficulties are obviated in a simple manner, by forming the conductor of two parallel sets of conductors, and by locating the connecting bridges between these two sets. In this manner the protruding of the connecting bridges on the outer edges of the conducting bar is avoided without the use of special processes in manufacturing, and without interfering with the heat conductivity. I derive an additional advantage from the fact that only half the width is required for each bridge, and thus reduce the eddy currents, which are necessarily generated by the vertical location of the bridges causing a loss of energy through cross currents.

I attain these objects by the structure illustrated in the accompanying drawing, which shows a typical example of the new conducting bar.

Referring to the accompanying drawing, Fig. 1 shows the stamping from which the individual laminæ are formed; Figs. 2 and 3 show the final shapes of the laminæ; Fig. 4 shows the complete structure of a conductor embodying my invention, and Fig. 5 is a view of a modified form of my conductor.

In the drawing, A and A' each form one part, C and C' the other parts and B—B' the bridging portions or members between these parts. It will be noted that the portions A and C of each lamina are substantially parallel and are located in different parallel planes, the bridging portion B connecting the sides of the parallel portions. In the particular arrangement shown, portions A and C extend from the bridging portion B on different sides thereof, as do the parts A' and C' from the bridging portion B'.

Fig. 4 shows the complete structure of the conducting bar. In this case it is built up of two sections or sets arranged side by side, each made of seven laminæ marked $A_1$— $A_2$— $A_3$— $A_4$— ... $C_1$— $C_2$— $C_3$— ... and $A'_1$— $A'_2$— $A'_3$. Parts $A_1$— $A_2$— $A_3$— $A_4$ ... belong to one set, parts $C_1$— $C_2$— $C_3$ belong to the other set. The two sets are connected by bridges $B_1$— $B_2$— $B_3$ located between said sets. Parts $A'_1$— $A'_2$— $A'_3$ ... which are located in the same set at $C_1$— $C_2$— $C_3$ ... have corresponding pieces, which are in the same manner located in set $A_1$— $A_2$— $A_3$. It will be noted from the drawing that the top and bottom laminæ of both sets terminate at different distances from the end of the conductor whereby other laminæ will become the top and bottom laminæ successively, and that the top laminæ $A_1$— $A_2$— $A_3$ of one set are connected to the bottom laminæ $C_1$— $C_2$— $C_3$ of the other set by the bridging members $B_1$—$B_2$—$B_3$, and the top laminæ $A'_1$—$A'_2$—$A'_3$ of the other set are connected to the bottom laminæ of the first mentioned set by other bridging members, the bridging members being located at different distances from the end of the conductor. The upper as well as the lower surfaces of the conducting bar will not be flat as is the case in other customary makes. In practice a surface sufficiently flat may be obtained by breaking the sharp corners. If this should not be satisfactory wedge shaped pieces may be inserted for obtaining perfectly flat surfaces, see Fig. 5 D. These wedges may be made of metal and be riveted to the lamina which forms its bearing.

It is not essential to shape the lamina as described, where the bridge connects two pieces located in a right and left set.

I desire it to be understood that my invention is not limited to the construction shown and described, and I aim in the appended claims to cover all modifications which do not depart from the spirit and scope of my invention.

Having thus described my invention I claim:

1. In a dynamo electric machine, an electrical conductor comprising a number of laminæ, each consisting of two substantially parallel portions located in different parallel planes and a bridging portion connecting the sides of said parallel portions, the laminæ forming the conductor being assembled in two sets arranged side by side with the bridging portions located between said sets.

2. In a dynamo electric machine, an electrical conductor comprising a number of laminæ, each lamina consisting of two substantially parallel portions located in different parallel planes and a bridging portion connecting the sides of said parallel portions, the parallel portions extending from the bridging portion on different sides thereof, the laminæ forming the conductor being assembled in two sets arranged side by side with the bridging portions located between said sets.

3. In a dynamo electric machine, an electrical conductor comprising laminæ assembled in two sets, said sets being arranged side by side, the top and bottom laminæ of said sets successively terminating at different distances from the end of the conductor whereby other laminæ become the top and bottom laminæ successively, said top and bottom laminæ being connected by bridging members, said bridging members being located between said sets of laminæ at different distances from the end of the conductor.

4. In a dynamo electric machine, an electrical conductor comprising laminæ assembled in two sets, said sets being arranged side by side, the top and bottom laminæ of said sets successively terminating at different distances from the end of the conductor whereby other laminæ become the top and bottom laminæ successively, the top laminæ of one set being connected to the bottom laminæ of the other set by bridging members, the top laminæ of the other set being connected to the bottom laminæ of the first set by bridging members, said bridging members being located between said sets of laminæ and at different distances from the end of the conductor.

In witness whereof, I have hereunto set my hand this twenty-fourth day of March, 1922.

FRIEDRICH KADE.